US012594564B2

(12) United States Patent
Endo

(10) Patent No.: US 12,594,564 B2
(45) Date of Patent: Apr. 7, 2026

(54) INJECTION NOZZLE AND INJECTION DEVICE INCLUDING INJECTION NOZZLE

(71) Applicant: INVENT CO., LTD., Tokyo (JP)

(72) Inventor: Seiji Endo, Gyoda (JP)

(73) Assignee: INVENT CO., LTD., Tokyo (JP)

( * ) Notice: Subject to any disclaimer, the term of this patent is extended or adjusted under 35 U.S.C. 154(b) by 517 days.

(21) Appl. No.: 18/020,205

(22) PCT Filed: Aug. 12, 2021

(86) PCT No.: PCT/JP2021/029767
§ 371 (c)(1),
(2) Date: Feb. 7, 2023

(87) PCT Pub. No.: WO2022/034917
PCT Pub. Date: Feb. 17, 2022

(65) Prior Publication Data

US 2023/0264209 A1 Aug. 24, 2023

(30) Foreign Application Priority Data

Aug. 14, 2020 (JP) ................................ 2020-137148

(51) Int. Cl.
*B05B 3/04* (2006.01)
*B05B 3/02* (2006.01)
(Continued)

(52) U.S. Cl.
CPC ................ *B05B 3/04* (2013.01); *B05B 3/021* (2013.01); *B05C 5/02* (2013.01); *B08B 3/02* (2013.01)

(58) Field of Classification Search
CPC ......... B05B 3/0409; B05B 3/021; B05C 5/02; B08B 3/02
See application file for complete search history.

(56) References Cited

U.S. PATENT DOCUMENTS 5,533,673 A * 7/1996 Wilson ...................... B05B 3/04 239/227
2009/0057443 A1 3/2009 Sendo
(Continued)

FOREIGN PATENT DOCUMENTS

JP S46-26285 Y 9/1971
JP 2003-154294 A 5/2003
(Continued)

OTHER PUBLICATIONS

Oct. 12, 2021 International Search Report issued in International Patent Application No. PCT/JP2021/029767.
(Continued)

*Primary Examiner* — Steven M Cernoch
(74) *Attorney, Agent, or Firm* — Oliff PLC

(57) ABSTRACT

An object is to effectively remove dirt adhering to a surface to be cleaned and improve supply efficiency of a compressed gas. The injection nozzle of the invention is configured such that a rotating body housing portion is provided in an outer cover, a rotating body is provided in the rotating body housing portion, a rotating body protruding portion is provided in the rotating body, a distal end portion of the rotating body protruding portion protrudes outward through an opening portion provided in the outer cover, a liquid discharge pipe is provided inside the rotating body, and a distal end portion of the liquid discharge pipe is inserted into an insertion hole of the rotating body protruding portion.

9 Claims, 7 Drawing Sheets

(51) Int. Cl.
*B05C 5/02* (2006.01)
*B08B 3/02* (2006.01)

(56) References Cited

U.S. PATENT DOCUMENTS

| | | | | |
|---|---|---|---|---|
| 2014/0061334 | A1* | 3/2014 | Liao | B05B 7/2435 239/315 |
| 2015/0266041 | A1* | 9/2015 | Liao | B05B 3/06 239/373 |

FOREIGN PATENT DOCUMENTS

| | | | |
|---|---|---|---|
| JP | 2007-253040 | A | 10/2007 |
| JP | 2009-61354 | A | 3/2009 |
| JP | 2012-30162 | A | 2/2012 |
| JP | 2014-200737 | A | 10/2014 |
| JP | 2017-56400 | A | 3/2017 |
| JP | 2017-192880 | A | 10/2017 |

OTHER PUBLICATIONS

Jan. 4, 2023 Office Action issued in Japanese Patent Application No. 2022-542881.
Oct. 12, 2021 Written Opinion issued in International Patent Application No. PCT/JP2021/029767.

* cited by examiner

INJECTION NOZZLE AND INJECTION DEVICE INCLUDING INJECTION NOZZLE

TECHNICAL FIELD

The present invention relates to an injection nozzle that injects and sprays a mixed fluid of gas and liquid to a predetermined region, and an injection device including the injection nozzle.

BACKGROUND ART

In the related art, there has been known an injection device that injects a mixed fluid of gas and liquid to remove dirt on a target surface. As this type of injection device, for example, an injection device disclosed in Patent Literature 1 below is known. The injection device disclosed in Patent Literature 1 includes an outer nozzle and an inner nozzle, and is configured to be ejected from a distal end of the nozzle in a state where a pressurized gas ejected from the outer nozzle and a cleaning liquid ejected from the inner nozzle are mixed.

CITATION LIST

Patent Literature

Patent Literature 1: JP 2003-154294 A

SUMMARY OF INVENTION

Technical Problem

In the ejection device disclosed in Patent Literature 1 described above, the pressurized gas and the cleaning liquid are not sufficiently mixed at the time of injection, so that the dispersion of the cleaning liquid becomes insufficient, and the cleaning liquid to be injected has a coarse particle size. As a result, there is a problem that it is difficult to sufficiently remove dirt adhering to the target surface. In addition, since the ejection device requires a high pressure when ejecting the cleaning liquid using the pressurized gas supplied from a pressurized gas supply source, there is also a problem that supply efficiency of the pressurized gas is poor.

The present invention has been made in view of such problems, and an object of the present invention is to provide an injection nozzle capable of effectively removing dirt adhering to a surface to be cleaned and improving supply efficiency of compressed gas when used for cleaning, and an injection device including the injection nozzle.

Solution to Problem

In the present invention, (1) there is provided an injection nozzle in which a rotating body housing portion is provided in an outer cover, a rotating body is provided in the rotating body housing portion, a rotating body protruding portion is provided in the rotating body, a distal end portion of the rotating body protruding portion protrudes outward through an opening portion provided in the outer cover, a liquid discharge pipe is provided inside the rotating body, and a distal end portion of the liquid discharge pipe is inserted into an insertion hole of the rotating body protruding portion, (2) in the injection nozzle according to (1), in which the rotating body is provided with a rotating blade, (3) in the injection nozzle according to (1) or (2), in which the rotating body includes a rotating body main body, the rotating body protruding portion is provided to be connected to the rotating body main body, an insertion hole mutually communicating with each of the rotating body main body and the rotating body protruding portion is provided, and the liquid discharge pipe is inserted into the communicated insertion hole, (4) in the injection nozzle according to any one of (1) to (3), in which the liquid discharge pipe is formed of a flexible material, (5) in the injection nozzle according to any one of (1) to (4), in which a cover body is provided inside the outer cover, and compressed gas is introduced into the rotating body housing portion through the cover body, and (6) there is provided an injection device including: an injection nozzle in which a rotating body housing portion is provided in an outer cover, a rotating body is provided in the rotating body housing portion, a rotating body protruding portion is provided in the rotating body, a distal end portion of the rotating body protruding portion protrudes outward through an opening portion provided in the outer cover, a liquid discharge pipe is provided inside the rotating body, and a distal end portion of the liquid discharge pipe is inserted into an insertion hole of the rotating body protruding portion; a compressed gas supply unit configured to introduce a compressed gas from a compressed gas supply source into the rotating body housing portion of the injection nozzle; and a liquid supply unit configured to feed a liquid to the liquid discharge pipe provided inside the rotating body in the injection nozzle.

Advantageous Effects of Invention

In an injection nozzle of the present invention, a rotating body housing portion is provided in an outer cover, a rotating body is provided in the rotating body housing portion, a rotating body protruding portion is provided in the rotating body, a distal end portion of the rotating body protruding portion protrudes outward through an opening portion provided in the outer cover, a liquid discharge pipe is provided inside the rotating body, and a distal end portion of the liquid discharge pipe is inserted into an insertion hole of the rotating body protruding portion. Therefore, when an injection device is driven to inject a compressed gas from the insertion hole of the rotating body protruding portion, a negative pressure can be generated around an injection port of the liquid discharge pipe, and a liquid can be sucked by the negative pressure and injected from the liquid discharge pipe. As a result, according to the injection device of the present invention, it is possible to inject the liquid without requiring a high pressure as in the case of ejecting the liquid in a pressurized state and without setting a supply pressure of the compressed gas to be high, thereby improving supply efficiency of the compressed gas. In addition, according to the present invention, it is possible to spray a mixed fluid of the injected liquid and the compressed gas to a target surface in a wide range in vertical and horizontal directions, thereby increasing a spraying area and increasing injection efficiency.

DESCRIPTION OF EMBODIMENTS

An injection nozzle and an injection device of the present invention can be used for the purpose of cleaning or coating, and can inject a cleaning liquid or a coating liquid and spray the liquid onto a target surface. In the present invention, the "liquid" means the cleaning liquid or the coating liquid. Hereinafter, embodiments of the present invention will be described in detail with reference to the drawings by taking a case where the injection nozzle and the injection device are used for the purpose of cleaning as an example.

Figure 1:
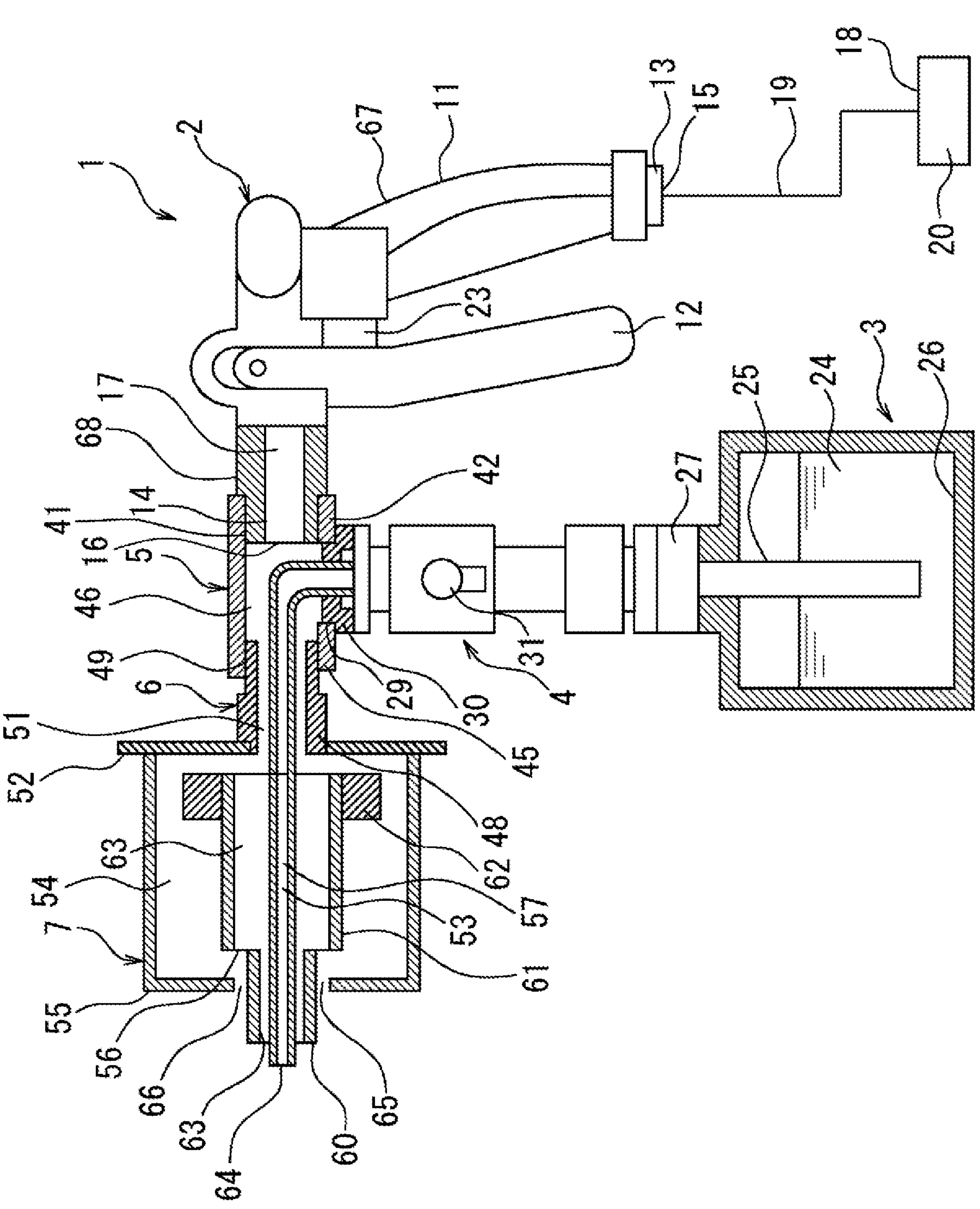
FIG. 1 is a side view illustrating an injection device according to a first embodiment of the present invention in a partial cross section.
Figure 2A:
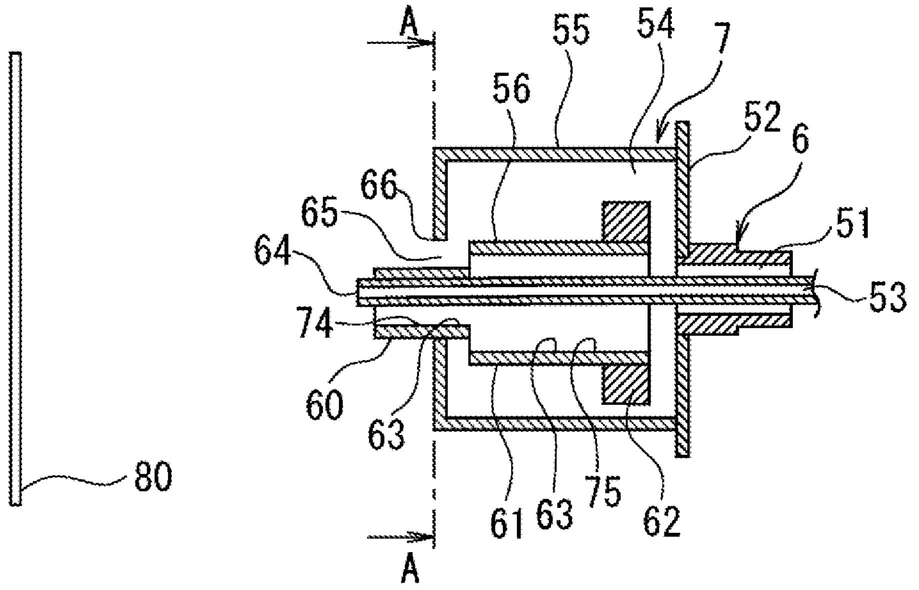
FIG. 2A is a view in which an injection nozzle faces a surface to be cleaned, and is a longitudinal sectional view illustrating forms of the injection nozzle and a nozzle attachment portion when driving of the injection device is stopped.
Figure 2B:
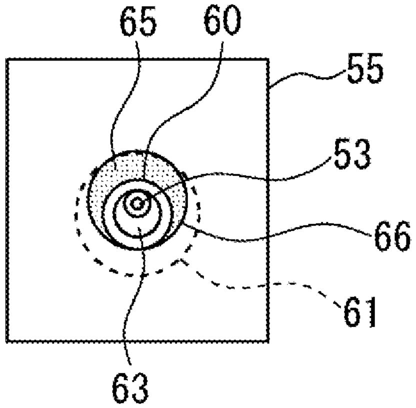
FIG. 2B is a front view when the injection nozzle illustrated in FIG. 2A is viewed from a direction of an arrow A-A.

FIG. 1 is a side view illustrating an injection device according to a first embodiment of the present invention in a partial cross section, FIG. 2A is a view in which an injection device faces a surface to be cleaned, and is a longitudinal sectional view illustrating forms of an injection nozzle and a nozzle attachment portion when driving of the injection device is stopped, and FIG. 2B is a front view when the injection nozzle illustrated in FIG. 2A is viewed from a direction of an arrow A-A. In the side view illustrated in FIG. 1, a horizontal direction indicates a front-rear direction, a left direction in the horizontal direction is a front position, and the opposite right direction is a rear position. In addition, a vertical direction with respect to the horizontal direction indicates an up-down direction, an upward direction in the vertical direction is an upper position, and the opposite downward direction is a lower position.

In FIG. 1, a reference numeral 1 denotes an injection device according to the present embodiment, and the injection device 1 includes an operation unit 2, a compressed gas supply source 18, a storage container 3, an on-off valve operation member 4, a coupling body 5, a nozzle attachment portion 6, and an injection nozzle 7. The injection nozzle 7 includes an outer cover 55, a rotating body housing portion 54 is formed inside the outer cover 55, and a rotating body 56 rotatably provided is housed in the rotating body housing portion 54. The rotating body 56 includes a rotating body main body 61, a rotating body protruding portion 60 formed in front of the rotating body main body 61, and rotating blades 62 provided in a rear portion of the rotating body main body 61. Both the rotating body main body 61 and the rotating body protruding portion 60 are formed in a cylindrical shape. An insertion hole 63 is formed inside the rotating body main body 61, and an insertion hole 63 communicating with the insertion hole 63 of the rotating body main body 61 is also formed inside the rotating body protruding portion 60. The rotating blade 62 has an action of rotating the rotating body 56 by receiving the force of a compressed gas 20, and a plurality of the rotating blades are provided along an outer peripheral surface of the rotating body main body 61.

The operation unit 2 includes a gun body 11 and a trigger 12. The gun body 11 has a grip portion 67, and a cylindrical portion 68 is provided at a front position of the trigger 12. An inflow end 13 is formed at a lower end of the grip portion 67, and an outflow end 14 is formed at a distal end of the cylindrical portion 68. An introduction port 15 for introducing the compressed gas 20 is formed at the inflow end 13, and a discharge port 16 for discharging the compressed gas 20 introduced from the introduction port 15 is formed at the outflow end 14. A flow passage 17 for guiding the compressed gas 20 is formed between the introduction port 15 and the discharge port 16. Regarding the flow passage 17, only the flow passage 17 in the cylindrical portion 68 is illustrated, and the flow passage 17 in other portions is not illustrated. A reference numeral 19 denotes a supply pipeline that communicates the introduction port 15 with the compressed gas supply source 18.

By operating the trigger 12, the compressed gas 20 can be sent from the compressed gas supply source 18 to the flow passage 17, and a flow rate of the compressed gas 20 can be adjusted. A reference numeral 23 denotes a flow rate adjusting unit for adjusting the flow rate of the compressed gas 20. When the trigger 12 is pulled to bring the trigger 12 close to the gun body 11, an opening area of a valve in the flow rate adjusting unit 23 increases, and the flow rate of the compressed gas 20 can increase. When a force for pulling the trigger 12 is loosened, the opening area of the valve in the flow rate adjusting unit 23 decreases, and the flow rate of the compressed gas 20 can be reduced. Note that the operation unit 2 is not limited to the one having the gun shape, and may have another shape other than the gun shape.

As the compressed gas supply source 18, for example, an air compressor is used. When the trigger 12 is pulled, the compressed gas 20 is fed from the compressed gas supply source 18 toward a compressed gas flow path 46 of the coupling body 5. The fed compressed gas 20 passes through the compressed gas flow path 46, and is introduced into the rotating body housing portion 54 via a gas introduction passage 51 provided in the nozzle attachment portion 6. While the trigger 12 is pulled, the compressed gas 20 is supplied to the rotating body housing portion 54 in the above path, and the supply is stopped by returning the trigger 12.

The storage container 3 for storing the cleaning liquid 24 is detachably provided below the on-off valve operation member 4. The storage container 3 stores the cleaning liquid 24 in a non-pressurized state. An insertion pipe 25 is inserted into the storage container 3 in a state of extending toward a bottom portion 26 of the storage container 3. By removing the storage container 3, the cleaning liquid 24 can be replenished or replaced with another cleaning liquid.

In a space where an internal space of the injection nozzle 7, the gas introduction passage 51 of the nozzle attachment portion 6, and an internal space of the coupling body 5 mutually communicate with each other, a liquid discharge pipe 53 having a circular tubular shape is inserted in the horizontal direction in a free state, bent in the vertical direction in the middle of the internal space of the coupling body 5, inserted into a coupling portion 30, and coupled in a communicating state with an upper end portion of a liquid passage (not illustrated) communicating with the insertion pipe 25 in the storage container 3. A passage formed inside the liquid discharge pipe 53 constitutes a cleaning liquid flow passage 57 through which the cleaning liquid 24 flows. The liquid discharge pipe 53 is formed of a flexible material, and examples of the flexible material include a polyethylene resin, a polypropylene resin, an epoxy resin, a polyurethane resin, a nylon resin, and the like.

The coupling portion 30 that couples an upper portion of the on-off valve operation member 4 is provided in the opening portion 29 of the coupling body 5, and a connecting portion 27 that couples a lower portion of the on-off valve operation member 4 is provided in an inlet portion of the storage container 3. The on-off valve operation member 4 is provided therein with an introduction portion (not illustrated) for introducing the cleaning liquid 24 stored in the storage container 3 to the liquid discharge pipe 53. A reference numeral 31 denotes an operation lever for operating an on-off valve of the on-off valve operation member 4. By operating the operation lever 31, a communication passage connecting the liquid discharge pipe 53 and the insertion pipe 25 can be blocked or opened. When the communication passage is opened by the operation lever 31, the cleaning liquid 24 can be introduced toward the liquid discharge pipe 53.

The coupling body 5 is coupled to each of the cylindrical portion 68, the nozzle attachment portion 6, and the coupling portion 30, and includes an inflow portion 42 having an inflow port 41 and a discharge portion 45 having a discharge port 49. The inflow portion 42 and the discharge portion 45 communicate with each other, and the compressed gas flow path 46 is formed between the inflow portion 42 and the discharge portion 45. The coupling between the coupling body 5 and the cylindrical portion 68, the coupling between the coupling body 5 and the nozzle attachment portion 6, and the coupling between the coupling body 5 and the coupling portion 30 can be performed using screw fitting or other coupling means. The compressed gas 20 introduced from the compressed gas supply source 18 passes through the inflow port 41 and the compressed gas flow path 46 of the coupling body 5, and is introduced from the discharge port 49 into the rotating body housing portion 54.

The nozzle attachment portion 6 includes a nozzle attachment body portion 48, the gas introduction passage 51, and an attachment plate 52. The injection nozzle 7 is attached to the front of the nozzle attachment portion 6, the injection nozzle 7 has the outer cover 55 and the rotating body 56 housed in the outer cover 55, and the outer cover 55 is fixed to the attachment plate 52 by a coupling means such as screwing. The outer cover 55 has a rectangular cylindrical shape, and an opening portion 66 is formed in a front plate of the outer cover 55, and the rotating body protruding portion 60 of the rotating body 56 protrudes outward through the opening portion 66. The outer cover 55 is not limited to a rectangular cylindrical shape, and may have a cylindrical shape. A gap portion 65 is formed between the opening portion 66 and the rotating body protruding portion 60. The opening portion 66 is preferably formed so as to be located at the center of the outer cover 55. The material of the outer cover 55 and the rotating body 56 is not particularly limited, but a synthetic resin is preferable, and for example, a general-purpose resin such as a polypropylene resin or a polyester resin can be used as the synthetic resin.

The rotating body housing portion 54 is formed in an internal space surrounded by the outer cover 55 and the attachment plate 52, and a space in the rotating body housing portion 54 communicates with a space of the rotating body main body 61, that is, the insertion hole 63. An outer diameter of the rotating body protruding portion 60 of the rotating body 56 is formed to be smaller than an outer diameter of the rotating body main body 61. The rotating blade 62 is provided to be inclined with respect to a peripheral surface of the rotating body main body 61. In this case, the rotating blade 62 can be provided to be inclined in a right rotation direction of the rotating body 56 or can be provided to be inclined in a left rotation direction, and the rotating body 56 can be rotated in the right direction or the left direction depending on the posture of the rotating blade 62.

The opening portion 66 is formed in the front plate of the outer cover 55, and the rotating body protruding portion 60 of the rotating body 56 is inserted into the opening portion 66. A distal end portion of the rotating body protruding portion 60 protrudes outward from the opening portion 66. The gap portion 65 is formed between the opening portion 66 and the rotating body protruding portion 60, and the compressed gas 20 can be ejected outward from the gap portion 65. The insertion hole 63 of the rotating body main body 61 and the insertion hole 63 of the rotating body protruding portion 60 communicate with each other as described above, and the liquid discharge pipe 53 is inserted into the communicating insertion holes 63 and 63. A distal end portion of the liquid discharge pipe 53 inserted into the insertion hole 63 of the rotating body protruding portion 60 protrudes outward from the insertion hole 63 of the rotating body protruding portion 60, and a protruding end portion thereof serves as an injection port 64 for injecting the cleaning liquid 24. A space through which the compressed gas 20 can pass is formed between the inner surface of the insertion hole 63 and the outer surface of the liquid discharge pipe 53 in a state where the distal end portion of the liquid discharge pipe 53 is inserted into the insertion hole 63 of the rotating body protruding portion 60. Therefore, the compressed gas 20 can also be ejected outward from the insertion hole 63 of the rotating body protruding portion 60. The insertion hole 63 of the rotating body main body 61 communicates with the gas introduction passage 51 in the nozzle attachment body portion 48.

In a state where the driving of the injection device 1 is stopped, as illustrated in FIGS. 2A and 2B, the rotating body protruding portion 60 of the rotating body 56 is in a state of abutting on the lower portion of the inner peripheral surface of the opening portion 66, and when the injection device 1 is driven, the rotating body 56 rotates while the rotating body protruding portion 60 abuts on the opening portion 66. The compressed gas 20 flowing into the rotating body housing portion 54 causes the rotating blades 62 of the rotating body 56 to receive wind pressure, thereby rotating the rotating body 56. Here, since the liquid discharge pipe 53 is inserted into the insertion holes 63 and 63 communicating between the insertion hole 63 of the rotating body main body 61 and the insertion hole 63 of the rotating body protruding portion 60, the rotating body 56 is supported by the liquid discharge pipe 53. As a result, the liquid discharge pipe 53 serves as a central axis of rotation of the rotating body 56, and the rotating body 56 rotates while being supported by the liquid discharge pipe 53. Since the rotating body 56 is not fixed to the liquid discharge pipe 53, the liquid discharge pipe 53 does not rotate. Meanwhile, since the rotating body 56 rotates in a state where the rotating body protruding portion 60 of the rotating body 56 abuts on the inner peripheral surface of the opening portion 66, the rotating body protruding portion 60 also rotates in an abutting state along the inner peripheral surface of the opening portion 66. The rotation of the rotating body protruding portion 60 along the inner peripheral surface of the opening portion 66 changes the direction of the rotation axis of the rotating body 56 with the liquid discharge pipe 53 as the central axis, and the rotating body 56 performs a circumferential movement so as to draw a circular orbit with the contact point between the rotating body protruding portion 60 and the opening portion 66 as a fulcrum. As described above, the rotational movement of the rotating body 56 about the liquid discharge pipe 53 as the central axis and the circumferential movement of the rotating body 56 rotating about the contact point between the rotating body protruding portion 60 and the opening portion 66 as a fulcrum simultaneously occur. Therefore, although the posture of the rotating body 56 performing the rotational movement continuously changes, since the liquid discharge pipe 53 supporting the rotating body 56 is made of a flexible material, it is possible to cope with a change in the posture of the rotating body 56.

Next, functions of the injection nozzle and the injection device in the embodiment of the present invention will be described. An embodiment in which the rotating body 56 rotates in the right direction when the rotating body 56 is viewed from the direction of the arrow A-A in FIG. 2A, that is, when the rotating body 56 is viewed from the front will be described. As illustrated in FIG. 2A, the front portion of the liquid discharge pipe 53 inserted through the insertion hole 63 of the rotating body protruding portion 60 abuts on the upper portion of the inner peripheral surface of the insertion hole 63, and the rotating body protruding portion 60 abuts on the lower portion of the inner peripheral surface of the opening portion 66. In this state, as illustrated in FIG. 2B, the gap portion 65 in which a space gradually increases from a lower portion of the inner peripheral surface of the opening portion 66 to an upper portion of the inner peripheral surface is formed between the rotating body protruding portion 60 and the opening portion 66.

A compressor which is a compressed gas supply source 18 illustrated in FIG. 1 is driven. The communication passage connecting the liquid discharge pipe 53 and the insertion pipe 25 is opened by the operation lever 31 of the on-off valve operation member 4.

When the trigger 12 of the gun body 11 is pulled, the compressed gas 20 is sent from the compressor, and the compressed gas 20 is introduced into the insertion hole 63 of the rotating body protruding portion 60 through the flow passage 17, the compressed gas flow path 46, the gas introduction passage 51, the rotating body housing portion 54, and the insertion hole 63 of the rotating body main body 61. The compressed gas 20 having passed through the insertion hole 63 of the rotating body protruding portion 60 is vigorously injected from the distal end portion of the insertion hole 63, whereby a negative pressure is generated around the injection port 64 of the liquid discharge pipe 53. As a result, a negative pressure is also generated inside the cleaning agent flow passage 57 and the insertion pipe 25 in the liquid discharge pipe 53, so that the cleaning liquid 24 in the storage container 3 is sucked up from the insertion pipe 25, and the cleaning liquid 24 is injected from the injection port 64 through the liquid discharge pipe 53.

Figure 3A:
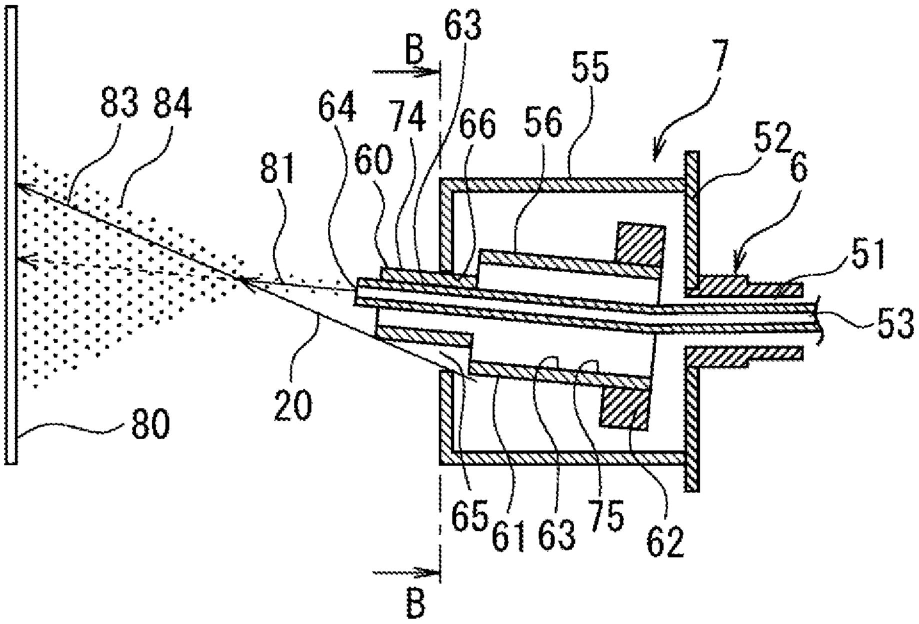
FIG. 3A is a longitudinal sectional view illustrating the forms of the injection nozzle and the nozzle attachment portion when the injection device is in operation.
Figure 3B:
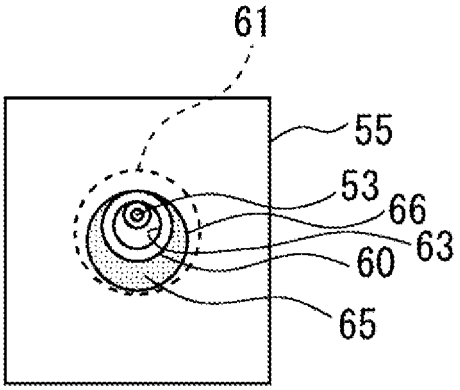
FIG. 3B is a front view when the injection nozzle illustrated in FIG. 3A is viewed from a direction of an arrow B-B.

Meanwhile, the compressed gas 20 introduced into the rotating body housing portion 54 acts on the rotating blades 62 of the rotating body 56, and rotates the rotating body 56 in the right direction by the pressure of the compressed gas 20. By the rotation of the rotating body 56, the pressure of the compressed gas 20 in the rotating body housing portion 54 increases, and a higher pressure state is obtained. FIGS. 3A and 3B illustrate a state in which the rotating body 56 rotates and the rotating body protruding portion 60 abuts on the upper portion of the inner peripheral surface of the opening portion 66. In this state, as illustrated in FIG. 3A, the posture of the rotating body 56 is an inclined posture in which the front portion thereof faces upward, and the liquid discharge pipe 53 is curved from the middle so as to correspond to the inclined posture. Since the liquid discharge pipe 53 is formed of a flexible material, the liquid discharge pipe can be curved corresponding to the inclined posture of the rotating body 56.

As illustrated in FIG. 3A, the rotating body protruding portion 60 abuts on an upper portion of the inner peripheral surface of the opening portion 66 and takes an upward posture. Since the front portion of the liquid discharge pipe 53 abuts on the upper portion of the inner peripheral surface of the rotating body protruding portion 60 in the upward posture, the liquid discharge pipe 53 is also in the upward posture as illustrated in FIG. 3A, and thus, the cleaning liquid 24 injected from the ejection port 64 is injected upward. The injected cleaning liquid 24 is mixed with the compressed gas 20 injected from the insertion hole 63 to become a mixed fluid 81. Here, as illustrated in FIG. 3B, the gap portion 65 in which the space gradually increases from the upper portion of the inner peripheral surface of the opening portion 66 to the lower portion of the inner peripheral surface is formed between the rotating body protruding portion 60 and the opening portion 66.

The compressed gas 20 is injected from the gap portion 65, and the compressed gas 20 mixes with the mixed fluid 81 and diffuses the mixed fluid 81. Since the compressed gas 20 injected from the gap portion 65 becomes a gas flow flowing upward, the mixed fluid 81 becomes the fluid 83 diffused upward. The diffused fluid 83 becomes the fluid 84 having a small particle diameter, and in this manner, the cleaning liquid 24 ejected from the injection port 64 is sprayed to the upper region of the surface to be cleaned 80 as the fluid 84 having a small particle diameter, and the surface to be cleaned 80 is cleaned. In the rotational movement of the rotating body 56, since the front portion of the liquid discharge pipe 53 abuts on the upper portion of the peripheral surface of the insertion hole 63, the rotating body 56 does not incline too obliquely upward, and thus, the front surface portion of the rotating body main body 61 does not contact the inner surface of the outer cover 55, and thus, it is possible to secure the space of the gap portion 65 without closing the gap portion 65. In the inclined posture of the rotating body 56 as described above, the rotating blades 62 do not come into contact with the inner surface of the outer cover 55. Similarly, in the rotational posture of the rotating body 56 in FIGS. 4, 5, and 6, the rotating body 56 does not come into contact with the inner surface of the outer cover 55.

Figure 4A:
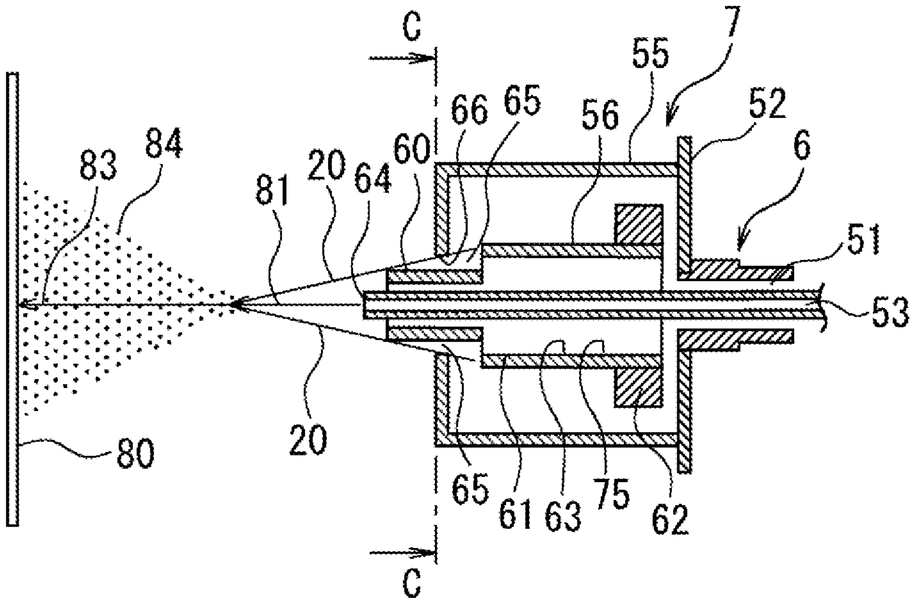
FIG. 4A is a longitudinal sectional view illustrating the forms of the injection nozzle and the nozzle attachment portion when the injection device is in operation.
Figure 4B:
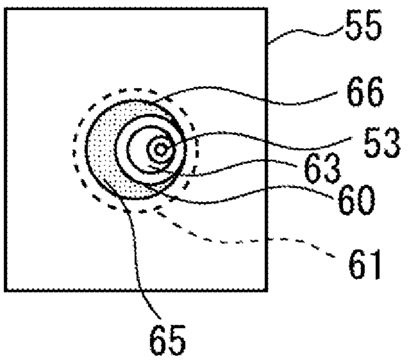
FIG. 4B is a front view when the injection nozzle illustrated in FIG. 4A is viewed from a direction of an arrow C-C.

FIGS. 4A and 4B illustrate a state in which the rotating body 56 rotates in the right direction, and the rotating body protruding portion 60 abuts on the right portion of the inner peripheral surface of the opening portion 66. When the rotating body 56 is viewed from the direction of an arrow C-C in FIG. 4A, that is, when the rotating body 56 is viewed from the front, the posture of the rotating body 56 is a posture in which a front portion thereof is inclined rightward. The rotating body protruding portion 60 abuts on the right portion of the inner peripheral surface of the opening portion 66 and takes a rightward posture in the front view of FIG. 4B. Since the front portion of the liquid discharge pipe 53 abuts on the right portion of the inner peripheral surface of the rotating body protruding portion 60 in the rightward posture, the liquid discharge pipe 53 is also in the rightward posture in front view of the injection nozzle 7 in the same manner, and thus, the cleaning liquid 24 injected from the ejection port 64 is injected in the rightward direction in front view of the injection nozzle 7. The injected cleaning liquid 24 is mixed with the compressed gas 20 injected from the insertion hole 63 to become the mixed fluid 81. Here, as illustrated in FIG. 4B, a gap portion 65 in which the space gradually increases from the right portion of the inner peripheral surface of the opening portion 66 to the left portion of the inner peripheral surface is formed between the rotating body protruding portion 60 and the opening portion 66.

The compressed gas 20 is injected from the gap portion 65, and the compressed gas 20 mixes with the mixed fluid 81 and diffuses the mixed fluid 81. Since the compressed gas 20 injected from the gap portion 65 becomes a gas flow flowing in the right direction in the front view of the injection nozzle 7, the mixed fluid 81 becomes the fluid 83 diffused in the right direction in the front view of the injection nozzle 7. The diffused fluid 83 becomes the fluid 84 having a small particle diameter, and in this way, the cleaning liquid 24 injected from the injection port 64 is sprayed to a left region (left region when the surface to be cleaned 80 is viewed from the front) of the surface to be cleaned 80 as the fluid 84 having a small particle diameter, and the surface to be cleaned 80 is cleaned.

Figure 5A:
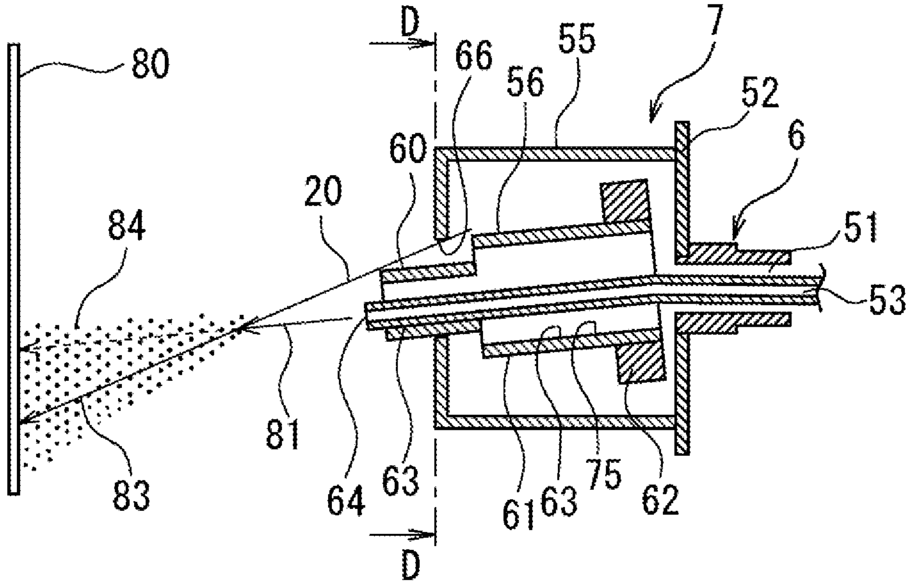
FIG. 5A is a longitudinal sectional view illustrating the forms of the injection nozzle and the nozzle attachment portion when the injection device is in operation.
Figure 5B:
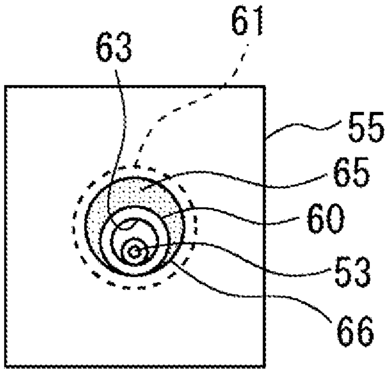
FIG. 5B is a front view when the injection nozzle illustrated in FIG. 5A is viewed from a direction of an arrow D-D.

FIGS. 5A and 5B illustrate a state in which the rotating body 56 rotates in the right direction, and the rotating body protruding portion 60 abuts on the lower portion of the inner peripheral surface of the opening portion 66. As illustrated in FIG. 5A, the front portion of the rotating body 56 is inclined downward. As illustrated in FIG. 5A, the rotating body protruding portion 60 abuts on the lower portion of the inner peripheral surface of the opening portion 66 and takes a downward posture. Since the front portion of the liquid discharge pipe 53 abuts on the lower portion of the inner peripheral surface of the rotating body protruding portion 60 in the downward posture, the liquid discharge pipe 53 is also in the downward posture as illustrated in FIG. 5A, and thus, the cleaning liquid 24 injected from the ejection port 64 is injected downward. The injected cleaning liquid 24 is mixed with the compressed gas 20 injected from the insertion hole 63 to become the mixed fluid 81. Here, as illustrated in FIG. 5B, the gap portion 65 in which a space gradually increases from the lower portion of the inner peripheral surface of the opening portion 66 to the upper portion of the inner peripheral surface is formed between the rotating body protruding portion 60 and the opening portion 66.

The compressed gas 20 is injected from the gap portion 65, and the compressed gas 20 mixes with the mixed fluid 81 and diffuses the mixed fluid 81. Since the compressed gas 20 injected from the gap portion 65 becomes a gas flow flowing downward, the mixed fluid 81 becomes the fluid 83 diffused downward. The diffused fluid 83 becomes the fluid 84 having a small particle diameter, and in this manner, the cleaning liquid 24 injected from the injection port 64 is sprayed as the fluid 84 having a small particle diameter to the lower region of the surface to be cleaned 80, and the surface to be cleaned 80 is cleaned.

Figure 6A:
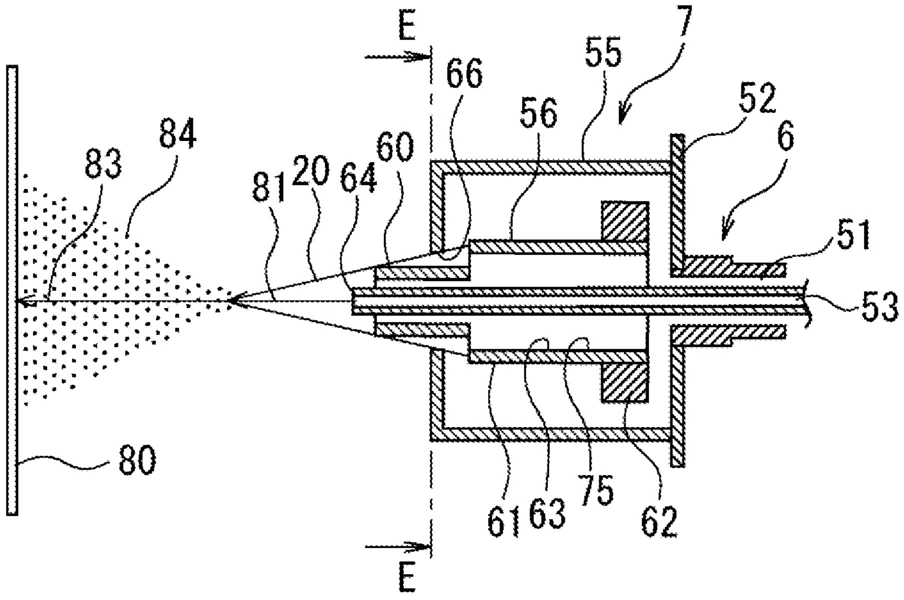
FIG. 6A is a longitudinal sectional view illustrating forms of the injection nozzle and the nozzle attachment portion when the injection device is in operation.
Figure 6B:
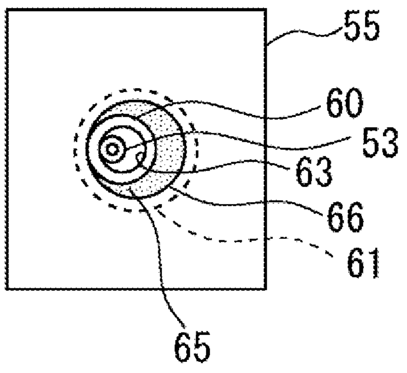
FIG. 6B is a front view when the injection nozzle illustrated in FIG. 6A is viewed from a direction of an arrow E-E.

FIGS. 6A and 6B illustrate a state in which the rotating body 56 rotates in the right direction, and the rotating body protruding portion 60 abuts on the left portion of the inner peripheral surface of the opening portion 66. When the rotating body 56 is viewed from a direction of an arrow E-E in FIG. 6A, that is, when the rotating body 56 is viewed from the front, the posture of the rotating body 56 is a posture in which a front portion thereof is inclined to the left side. The rotating body protruding portion 60 abuts on the left portion of the inner peripheral surface of the opening portion 66 and takes a leftward posture in the front view of FIG. 6B. Since the front portion of the liquid discharge pipe 53 abuts on the left portion of the inner peripheral surface of the rotating body protruding portion 60 in the leftward posture, the liquid discharge pipe 53 is also in the leftward posture in front view of the injection nozzle 7 in the same manner, and thus, the cleaning liquid 24 injected from the ejection port 64 is injected leftward in front view of the injection nozzle 7. The injected cleaning liquid 24 is mixed with the compressed gas 20 injected from the insertion hole 63 to become the mixed fluid 81. Here, as illustrated in FIG. 6B, the gap portion 65 in which the space gradually increases from the left portion of the inner peripheral surface of the opening portion 66 to the right portion of the inner peripheral surface thereof is formed between the rotating body protruding portion 60 and the opening portion 66.

The compressed gas 20 is injected from the gap portion 65, and the compressed gas 20 mixes with the mixed fluid 81 and diffuses the mixed fluid 81. Since the compressed gas 20 injected from the gap portion 65 becomes a gas flow flowing in the left direction in the front view of the injection nozzle 7, the mixed fluid 81 becomes the fluid 83 diffused in the left direction in the front view of the injection nozzle 7. The diffused fluid 83 becomes the fluid 84 having a small particle diameter, and in this way, the cleaning liquid 24 injected from the injection port 64 is sprayed to a right region (right region when the surface to be cleaned 80 is viewed from the front) of the surface to be cleaned 80 as the fluid 84 having a small particle diameter, and the surface to be cleaned 80 is cleaned.

As described above, in a state where the rotating body protruding portion 60 and the opening portion 66 abut on each other, the rotating body 56 rotates with the abutment portion as a fulcrum, and thus, the rotation axis changes in the circumferential direction according to the movement of the rotating body protruding portion 60 rotating along the inner peripheral surface of the opening portion 66. As a result, the mixed fluid 81 of the injected cleaning liquid 24 and compressed gas 20 can be sprayed to the surface to be cleaned 80 in a wide range in the vertical and horizontal directions, and the spraying area can be increased. According to the present embodiment, by mixing the cleaning liquid 24 with the compressed gas 20, the cleaning liquid 24 can be diffused in a particulate form, and the cleaning liquid 24 can be sprayed in a particulate form with a fine particle size, so that the cleaning liquid 24 can be uniformly sprayed to the surface to be cleaned 80, and detergency can be increased. According to the present embodiment, since the cleaning liquid 24 and the compressed gas 20 can be intensively injected to the vicinity of the injection port 64, the cleaning liquid 24 can be reliably injected to the surface to be cleaned 80 even when a distance between the injection nozzle 7 and the surface to be cleaned 80 is small, and efficient cleaning can be performed.

Figure 7:
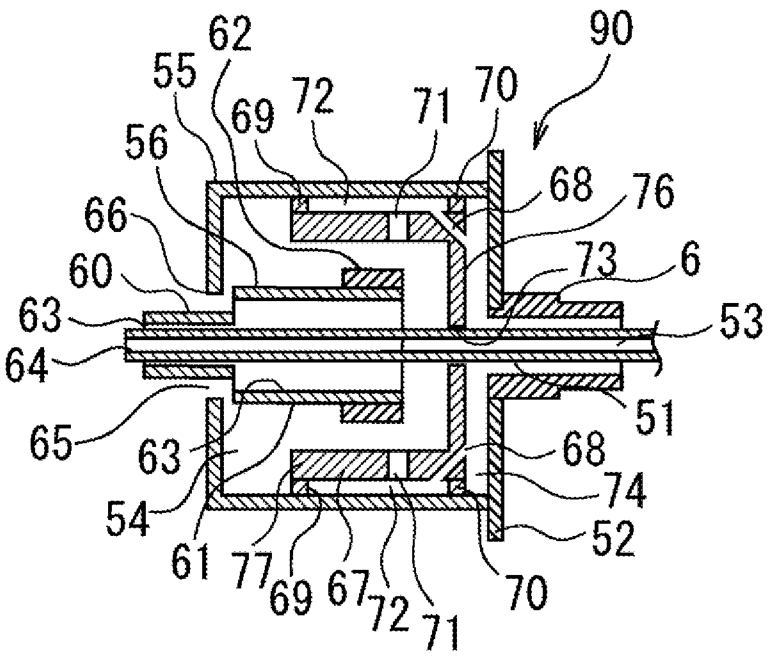
FIG. 7 is a longitudinal sectional view of an injection nozzle according to a second embodiment of the present invention.

Next, a second embodiment of the present invention will be described with reference to FIG. 7. An injection nozzle 90 in this embodiment is configured by providing a cover body 67 inside the outer cover 55. The cover body 67 includes a cylindrical portion 77 and a circular rear surface plate 76 that closes a rear opening portion of the cylindrical portion 77, and is formed as a cylindrical body in which a front portion is opened. The cover body 67 is fixed to the inner surface of the outer cover 55 by fixing portions 69 and 70, and in this fixed state, a space portion is formed between the inner surface of the outer cover 55 and the outer peripheral surface of the cover body 67, and this space portion is formed as a gas flowing portion 72.

A space portion 74 is formed between the rear surface plate 76 of the cover body 67 and the attachment plate 52. A plurality of oblique inflow holes 68 are provided along the circumferential direction at corner portions between the cylindrical portion 77 and the rear surface plate 76, and one end of each of the inflow holes 68 is opened to the space portion 74 and the other end is opened to the gas flowing portion 72. The cylindrical portion 77 is provided with a plurality of outflow holes 71 along the peripheral surface, and one end of each of the outflow holes 71 opens to the gas flowing portion 72 and the other end opens to the inner space of the cover body 67.

A diameter of the outflow hole 71 is preferably 0.3 mm to 3.0 mm, and more preferably 0.8 mm to 1.2 mm. A hole 73 through which the liquid discharge pipe 53 is inserted is formed in the rear surface plate 76. The rear portion of the rotating body 56 is housed in the inner space of the cover body 67, and thus, the rotating blade 62 is housed in the inner space of the cover body 67. The outflow hole 71 is preferably provided at a position near the rotating blade 62.

In this embodiment, when the compressed gas 20 is sent to the rotating body housing portion 54 through the gas introduction passage 51 of the nozzle attachment portion 6, the compressed gas 20 enters the space portion 74 and enters the gas flowing portion 72 through the inflow hole 68. The compressed gas 20 having entered the gas flowing portion 72 flows in the circumferential direction in the gas flowing portion 72 and flows out to the inner space of the cover body 67 through the outflow hole 71. The rotating blade 62 receives a force in the rotation direction by the compressed gas 20 flowing out from the outflow hole 71, and rotates the rotating body 56. When the outflow hole 71 is provided at a position near the rotating blade 62, the compressed gas 20 can be sprayed to the rotating blade 62 at a close distance, so that a large wind pressure can be applied to the rotating blade 62.

Since the compressed gas 20 flows out from the gas flowing portion 72 to the inner space of the cover body 67 through the outflow hole 71 having a small diameter, the compressed gas 20 in a high pressure state is supplied to the inner space of the cover body 67, whereby the pressure of the compressed gas 20 injected through the insertion hole 63 of the rotating body main body 61 and the insertion hole 63 of the rotating body protruding portion 60 can be made high. As a result, the negative pressure generated around the injection port 64 of the liquid discharge pipe 53 can increase, and the force for sucking the cleaning liquid 24 through the liquid discharge pipe 53 can increase.

In addition, as described above, since the compressed gas 20 in the high pressure state is supplied to the inner space of the cover body 67, the high-pressure compressed gas 20 is sprayed to the rotating blade 62, whereby the rotating body 56 is rotated at a high speed and the pressure of the compressed gas 20 injected from the gap portion 65 can be made high. As a result, the mixed fluid 81 can be injected toward the surface to be cleaned 80 at a high speed.

According to the embodiment of the present invention, by driving the injection device 1 to inject the compressed gas 20 from the insertion hole 63 of the rotating body protruding portion 60, a negative pressure can be generated around the injection port 64 of the liquid discharge pipe 53, and the cleaning liquid 24 can be sucked by the negative pressure and the cleaning liquid 24 can be injected from the liquid discharge pipe 53. As a result, according to the embodiment of the present invention, it is possible to inject the cleaning liquid 24 without requiring a high pressure as in the case of ejecting the cleaning liquid 24 in a pressurized state and without setting the supply pressure of the compressed gas 20 high, whereby the supply efficiency of the compressed gas 20 can be improved. Further, according to the embodiment of the present invention, the mixed fluid 81 of the injected cleaning liquid 24 and the compressed gas 20 can be sprayed to the surface to be cleaned 80 in a wide range in the vertical and horizontal directions, whereby the spraying area can be widened and the cleaning efficiency can be increased.

REFERENCE SIGNS LIST

- 1 injection device
- 7, 90 injection nozzle
- 53 liquid discharge pipe
- 54 rotating body housing portion
- 55 outer cover
- 56 rotating body
- 60 rotating body protruding portion
- 62 rotating blade
- 63 insertion hole
- 66 opening portion

The invention claimed is:

1. An injection nozzle, comprising:
   - an outer cover;
   - a rotating body housing portion that is provided in the outer cover;
   - a rotating body that is provided in the rotating body housing portion, wherein:
     - a rotating body protruding portion having an insertion hole is provided in the rotating body,
     - a distal end portion of the rotating body protruding portion protrudes outward through an opening portion provided in the outer cover,
     - the rotating body protruding portion abuts on an inner peripheral surface of the opening portion, and
     - a gap portion is formed between the opening portion and the rotating body protruding portion; and
   - a liquid discharge pipe that is provided inside the rotating body, wherein;
     - a distal end portion of the liquid discharge pipe is inserted into the insertion hole of the rotating body protruding portion,
     - the rotating body is configured to rotate while being supported by the liquid discharge pipe,
     - a compressed gas is ejected outward from both the insertion hole and the gap portion, and
     - the rotating body is provided with a rotating blade that is configured to rotate the rotating body by receiving a force of the compressed gas.

2. The injection nozzle according to claim 1, wherein the rotating body includes a rotating body main body, the rotating body protruding portion is provided to be connected to the rotating body main body, the insertion hole mutually communicates with each of the rotating body main body and the rotating body protruding portion is provided, and the liquid discharge pipe is inserted into the insertion hole.

3. The injection nozzle according to claim 2, wherein the liquid discharge pipe is formed of a flexible material.

4. The injection nozzle according to claim 3, wherein a cover body is provided inside the outer cover, and the compressed gas is introduced into the rotating body housing portion through the cover body.

5. The injection nozzle according to claim 2, wherein a cover body is provided inside the outer cover, and the compressed gas is introduced into the rotating body housing portion through the cover body.

6. The injection nozzle according to claim 1, wherein the liquid discharge pipe is formed of a flexible material.

7. The injection nozzle according to claim 6, wherein a cover body is provided inside the outer cover, and the compressed gas is introduced into the rotating body housing portion through the cover body.

8. The injection nozzle according to claim 1, wherein a cover body is provided inside the outer cover, and the compressed gas is introduced into the rotating body housing portion through the cover body.

9. An injection device comprising:

an injection nozzle that includes:

an outer cover;

a rotating body housing portion that is provided in the outer cover;

a rotating body that is provided in the rotating body housing portion, wherein:

a rotating body protruding portion having an insertion hole is provided in the rotating body, a distal end portion of the rotating body protruding portion protrudes outward through an opening portion provided in the outer cover, the rotating body protruding portion abuts on an inner peripheral surface of the opening portion, and a gap portion is formed between the opening portion and the rotating body protruding portion; and a liquid discharge pipe that is provided inside the rotating body, wherein:

a distal end portion of the liquid discharge pipe is inserted into the insertion hole of the rotating body protruding portion, the rotating body is configured to rotate while being supported by the liquid discharge pipe, a compressed gas is ejected outward from both the insertion hole and the gap portion, and the rotating body is provided with a rotating blade that is configured to rotate the rotating body by receiving a force of the compressed gas;

a compressed gas supply unit configured to introduce the compressed gas from a compressed gas supply source into the rotating body housing portion of the injection nozzle; and a liquid supply unit configured to feed a liquid to the liquid discharge pipe provided inside the rotating body in the injection nozzle.

* * * * *